(12) United States Patent
Shveidel et al.

(10) Patent No.: US 10,942,895 B2
(45) Date of Patent: *Mar. 9, 2021

(54) STORAGE SYSTEM WITH DECREMENT PROTECTION OF REFERENCE COUNTS

(71) Applicant: EMC IP Holding Company LLC, Hopkinton, MA (US)

(72) Inventors: Vladimir Shveidel, Pardes-Hana (IL); Lior Kamran, Rishon LeZion (IL); Oran Baruch, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/732,976

(22) Filed: Jan. 2, 2020

(65) Prior Publication Data

US 2020/0142859 A1 May 7, 2020

Related U.S. Application Data

(63) Continuation of application No. 16/040,231, filed on Jul. 19, 2018, now Pat. No. 10,558,613.

(51) Int. Cl.
*G06F 12/00* (2006.01)
*G06F 16/13* (2019.01)
(Continued)

(52) U.S. Cl.
CPC ............ *G06F 16/137* (2019.01); *G06F 3/061* (2013.01); *G06F 3/067* (2013.01); *G06F 3/0619* (2013.01);
(Continued)

(58) Field of Classification Search
CPC ...... G06F 3/061; G06F 3/0619; G06F 3/0632; G06F 3/067; G06F 9/45558; G06F 2009/45579
See application file for complete search history.

(56) References Cited

U.S. PATENT DOCUMENTS 7,444,464 B2 10/2008 Urmston et al.
8,095,726 B1 1/2012 O'Connell et al.
(Continued)

FOREIGN PATENT DOCUMENTS

WO 2016111954 A1 7/2016

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Prasith Thammavong
(74) *Attorney, Agent, or Firm* — Ryan, Mason & Lewis, LLP

(57) ABSTRACT

A storage system in one embodiment comprises a plurality of storage devices storing data pages. Each data page has a content-based signature derived from that data page. The content-based signatures are associated with physical locations storing the data pages. In response to receipt of a write input/output (IO) request that includes a data segment that is smaller than a page granularity of the storage devices, a content-based signature associated with the data segment is determined which also corresponds to a target data page stored at one of the physical locations. In response to determining the content-based signature, an inflight write count corresponding to the content-based signature is incremented. In response to a decrement request to decrement a reference count of the physical location corresponding to the content-based signature, a decrement flag corresponding to the content-based signature is set in the data structure and the decrement request is postponed.

20 Claims, 9 Drawing Sheets

(51) Int. Cl.
*G06F 3/06* (2006.01)
*G06F 9/455* (2018.01)

(52) U.S. Cl.
CPC ........ *G06F 3/0632* (2013.01); *G06F 9/45558* (2013.01); *G06F 2009/45579* (2013.01)

(56) References Cited

U.S. PATENT DOCUMENTS

| | | | |
|---|---|---|---|
| 8,214,612 | B1 | 7/2012 | Natanzon |
| 9,001,608 | B1 | 4/2015 | Chishti et al. |
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,569,357 | B1 | 2/2017 | Shalev et al. |
| 9,606,870 | B1 | 3/2017 | Meiri et al. |
| 9,678,968 | B1 | 6/2017 | Taylor et al. |
| 9,716,754 | B2 | 7/2017 | Swift |
| 2007/0283117 | A1 | 12/2007 | Krishnaswamy et al. |
| 2008/0155168 | A1* | 6/2008 | Sheu ............... G06F 12/1027 711/6 |
| 2008/0279462 | A1 | 11/2008 | Celi, Jr. |
| 2009/0132955 | A1 | 5/2009 | Garg et al. |
| 2010/0179941 | A1 | 7/2010 | Agrawal et al. |
| 2012/0155160 | A1* | 6/2012 | Alam ............... G06F 12/0638 365/158 |
| 2013/0311752 | A1 | 11/2013 | Brauch et al. |
| 2013/0325824 | A1 | 12/2013 | Shoens |
| 2014/0181016 | A1 | 6/2014 | Whitehead et al. |
| 2014/0281134 | A1 | 9/2014 | Eitan et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2016/0350325 | A1 | 12/2016 | Wang et al. |
| 2017/0192857 | A1 | 7/2017 | Meiri et al. |
| 2018/0018133 | A1* | 1/2018 | Balakrishnan ........ G06F 3/0659 |
| 2018/0060367 | A1 | 3/2018 | Ioannou et al. |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array9—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "Emc Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

* cited by examiner

| 402 | 404 | 406 |
|---|---|---|
| CONTENT-BASED SIGNATURE OF TARGET DATA PAGE | INFLIGHT WRITE COUNT | DECREF POSTPONED FLAG |
| CONTENT-BASED SIGNATURE OF TARGET DATA PAGE | INFLIGHT WRITE COUNT | DECREF POSTPONED FLAG |
| ⋮ | ⋮ | ⋮ |
| CONTENT-BASED SIGNATURE OF TARGET DATA PAGE | INFLIGHT WRITE COUNT | DECREF POSTPONED FLAG |

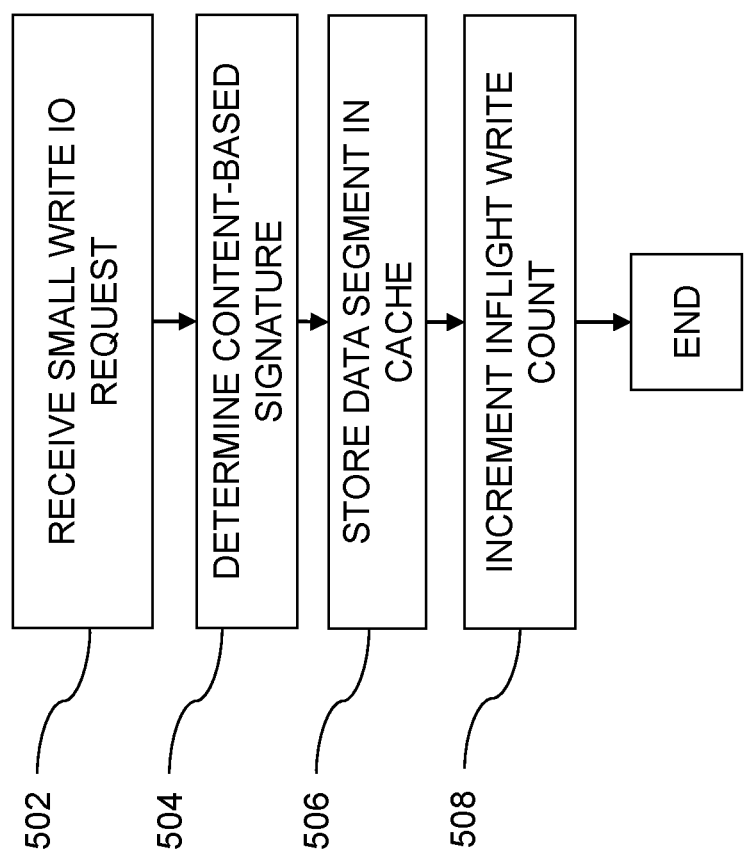

STORAGE SYSTEM WITH DECREMENT PROTECTION OF REFERENCE COUNTS

RELATED APPLICATION

The present application is a continuation of U.S. patent application Ser. No. 16/040,231, filed Jul. 19, 2018, and entitled "Storage System with Decrement Protection of Reference Counts," which is incorporated by reference herein in its entirety.

FIELD

The field relates generally to information processing systems, and more particularly to storage in information processing systems.

BACKGROUND

In some information processing systems, volatile write cache temporarily stores or caches data to be later written to a persistent data storage location (i.e., destaged) during a background destaging process. The information processing system may often have a fixed-size page granularity and the system may support write input/output (TO) requests for data segments smaller than the system's page granularity, i.e., small write requests. When a small write request is received, the write cache temporarily stores the new segment data associated with the small write request for later destaging in a write cache destaging process. During the destaging process, the new segment data associated with the small write request is hardened. For example, the data in the data page targeted by the small write request may be read and combined with the new segment data of the small write request to form a new data page which then is stored in the persistent data storage location. A received write request is considered a pending or "inflight" write request prior to being stored in the persistent data storage location, e.g., while awaiting or being processed in the destaging process.

In some systems, the data pages in the persistent data storage location may each have an associated reference count that indicates the number of references to that page in an address-to-hash (A2H) mapping of the information processing system. The reference count for a given data page may be updated as the number of references to that given data page increases or decreases. For example, increment ("Incref") and decrement ("Decref") commands may be issued to increment or decrement the reference count associated with a data page in the persistent data storage location.

When the reference count for a given data page is decremented to zero, the given data page may be removed or marked for removal since the data page is no longer used by the system.

SUMMARY

Illustrative embodiments provide techniques for decrement protection of reference counts for inflight small write requests in a storage system.

In one embodiment, a storage system comprises a plurality of storage devices and an associated storage controller. The plurality of storage devices are configured to store a plurality of data pages. Each of the data pages has a content-based signature derived from content of that data page. The content-based signatures of the data pages are associated with physical locations in the plurality of storage devices where the data pages are stored. The plurality of storage devices store a reference count for each physical location. A given reference count indicates a number of the data pages that map via their respective content-based signatures to the same physical location in the plurality of storage devices.

The storage controller is configured to receive a write input/output (TO) request. The write IO request includes a data segment that is smaller than a page granularity of the plurality of storage devices.

In response to receiving the write IO request, the storage controller is configured to determine a content-based signature associated with the data segment. The content-based signature corresponds to a target data page stored at one of the physical locations.

In response to a decrement request to decrement a reference count of the physical location corresponding to the content-based signature of the target data page, the storage controller is configured to postpone the decrement request.

The storage controller may be implemented using at least one processing device comprising a processor coupled to a memory.

In some embodiments, the storage controller may be further configured to increment an inflight write count corresponding to the determined content-based signature of the target data page in a data structure associated with the storage controller in response to determining the content-based signature associated with the data segment.

The storage controller may be further configured to decrement the inflight write count in response to completion of the received write IO request. The storage controller may be further configured to execute the postponed decrement request in response to the inflight write count being decremented to a predetermined value.

In some embodiments, in response to the decrement request, the storage controller may be further configured to set a decrement postponed flag corresponding to the content-based signature of the target data page in a data structure associated with the storage controller.

In response to a second decrement request to decrement the reference count of the physical location corresponding to the content-based signature of the target data page, the storage controller may be further configured to determine whether the decrement postponed flag corresponding to the content-based signature of the target data page is set in the data structure. In response to determining that the decrement postponed flag corresponding to the content-based signature of the target data page is set in the data structure, the storage controller may be further configured to decrement the reference count of the physical location corresponding to the content-based signature of the target data page.

In some embodiments, in response to a recovery of the storage system after an event, the storage controller may be further configured to reset the data structure. The storage controller may be further configured to determine whether any recovered write IO requests include a data segment smaller than a page granularity of the plurality of storage devices and, for a given write IO request that includes a data segment smaller than a page granularity of the plurality of storage devices, the storage controller may be further configured to increment the inflight write count corresponding to the content-based signature of a data page targeted by the given write IO request in the data structure. The storage controller may be further configured to determine whether the decrement request postponed journal includes a decrement request corresponding to the content-based signature of the data page targeted by the given write IO request. In response to determining that the decrement request postponed journal includes a decrement request corresponding to the content-based signature of the data page targeted by the given write IO request, the storage controller may be further configured to set the decrement postponed flag corresponding to the content-based signature of the data page targeted by the given write IO request in the data structure.

These and other illustrative embodiments include, without limitation, apparatus, systems, methods and processor-readable storage media.

BRIEF DESCRIPTION OF THE DRAWINGS

FIG. 4 shows an example of a decref hash table in an illustrative embodiment.

FIGS. 5A-5C are flow diagrams of portions of a process for decrement protection of reference counts for inflight small write requests in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
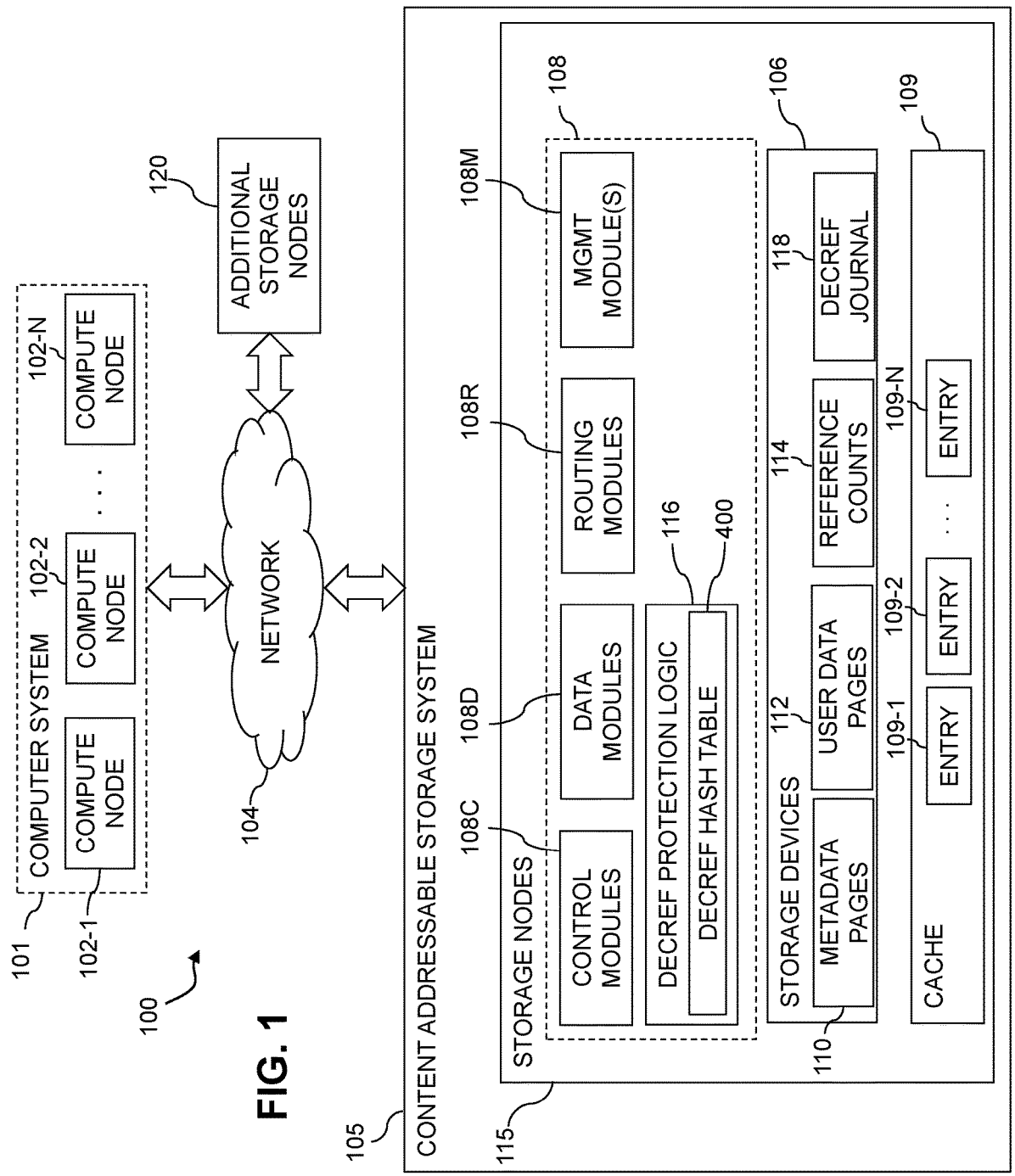
FIG. 1 is a block diagram of an information processing system comprising a content addressable storage system configured with functionality for decrement protection of reference counts for inflight small write requests in an illustrative embodiment.

FIG. 1 shows an information processing system 100 configured in accordance with an illustrative embodiment. The information processing system 100 comprises a computer system 101 that includes compute nodes 102-1, 102-2, . . . 102-N. The compute nodes 102 communicate over a network 104 with a content addressable storage system 105. The computer system 101 is assumed to comprise an enterprise computer system or other arrangement of multiple compute nodes associated with respective users.

The compute nodes 102 illustratively comprise respective processing devices of one or more processing platforms. For example, the compute nodes 102 can comprise respective virtual machines (VMs) each having a processor and a memory, although numerous other configurations are possible.

The compute nodes 102 can additionally or alternatively be part of cloud infrastructure such as an Amazon Web Services (AWS) system. Other examples of cloud-based systems that can be used to provide compute nodes 102 and possibly other portions of system 100 include Google Cloud Platform (GCP) and Microsoft Azure.

The compute nodes 102 may be viewed as examples of what are more generally referred to herein as "host devices" or simply "hosts." Such host devices are configured to write data to and read data from the content addressable storage system 105. The compute nodes 102 and the content addressable storage system 105 may be implemented on a common processing platform, or on separate processing platforms. A wide variety of other types of host devices can be used in other embodiments.

The compute nodes 102 in some embodiments illustratively provide compute services such as execution of one or more applications on behalf of each of one or more users associated with respective ones of the compute nodes 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone enterprise-based computing and storage system.

Such users of the storage system 105 in some cases are referred to herein as respective "clients" of the storage system 105.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The content addressable storage system 105 is accessible to the compute nodes 102 of the computer system 101 over the network 104. The content addressable storage system 105 comprises a plurality of storage devices 106, an associated storage controller 108, and an associated cache 109. The storage devices 106 are configured to store metadata pages 110 and user data pages 112, and may also store additional information not explicitly shown such as checkpoints and write journals. The metadata pages 110 and the user data pages 112 are illustratively stored in respective designated metadata and user data areas of the storage devices 106. Accordingly, metadata pages 110 and user data pages 112 may be viewed as corresponding to respective designated metadata and user data areas of the storage devices 106.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 110 and the user data pages 112.

The user data pages 112 are part of a plurality of logical units (LUNs) configured to store files, blocks, objects or other arrangements of data, each also generally referred to herein as a "data item," on behalf of users associated with compute nodes 102. Each such LUN may comprise particular ones of the above-noted pages of the user data area. The user data stored in the user data pages 112 can include any type of user data that may be utilized in the system 100. The term "user data" herein is therefore also intended to be broadly construed.

It is assumed in the present embodiment that the storage devices 106 comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). Various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the content addressable storage system 105 illustratively comprises a scale-out all-flash storage array such as an XtremIO™ storage array from Dell EMC of Hopkinton, Mass. Other types of storage arrays, including by way of example VNX® and Symmetrix VMAX® storage arrays also from Dell EMC, can be used to implement storage systems in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing a given storage system in an illustrative embodiment include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The content addressable storage system 105 in the embodiment of FIG. 1 is configured to generate hash metadata providing a mapping between content-based digests of respective ones of the user data pages 112 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 112. The hash metadata generated by the content addressable storage system 105 is illustratively stored as metadata pages 110 in the metadata area.

The generation and storage of the hash metadata is assumed to be performed under the control of the storage controller 108. The hash metadata may be stored in the metadata area in a plurality of entries corresponding to respective buckets each comprising multiple cache lines, although other arrangements can be used. In some aspects, the hash metadata may also be loaded into cache 109.

Figure 2:
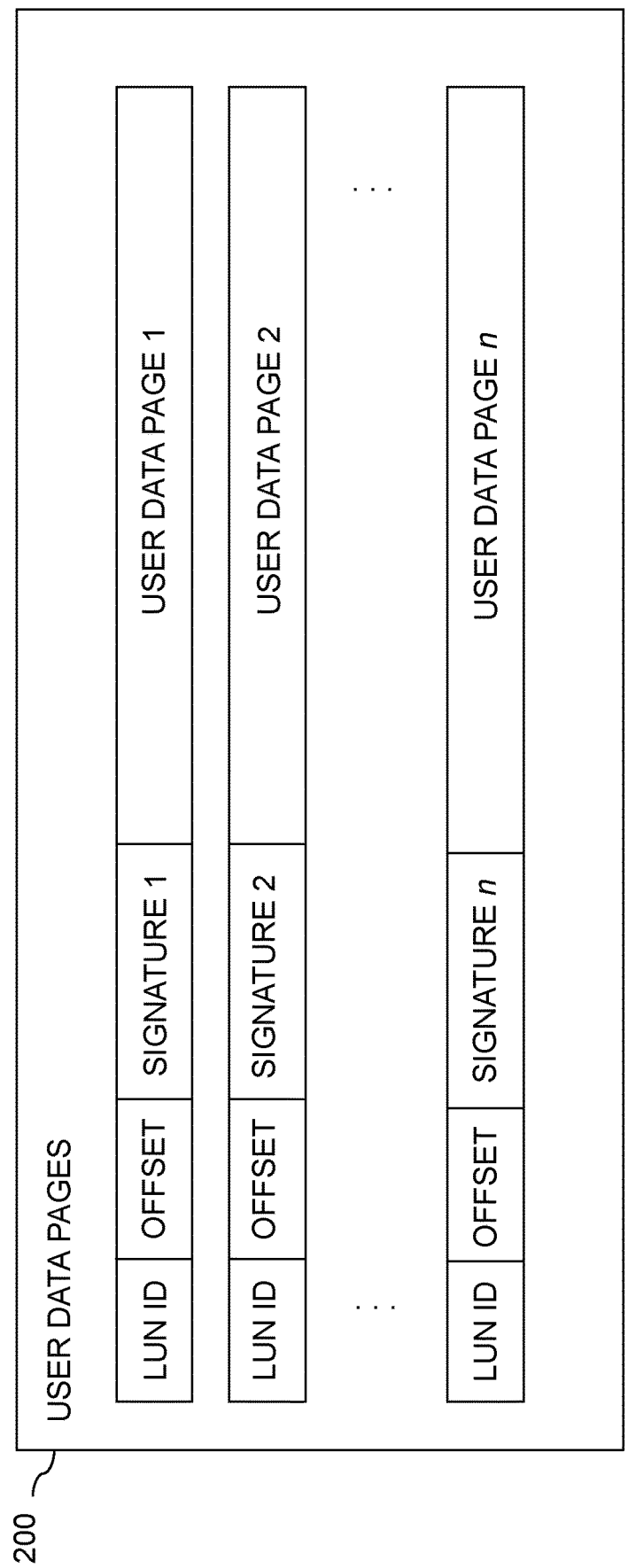
FIG. 2 shows an example of a set of user data pages in an illustrative embodiment.

Each of the metadata pages 110 characterizes a plurality of the user data pages 112. For example, as illustrated in FIG. 2, a given set of user data pages 200 representing a portion of the user data pages 112 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include SHA1, where SHA denotes Secure Hashing Algorithm, or other SHA protocols known to those skilled in the art. The content-based signature is utilized to determine the location of the corresponding user data page within the user data area of the storage devices 106 of the content addressable storage system 105.

Each of the metadata pages 110 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

Figure 3:
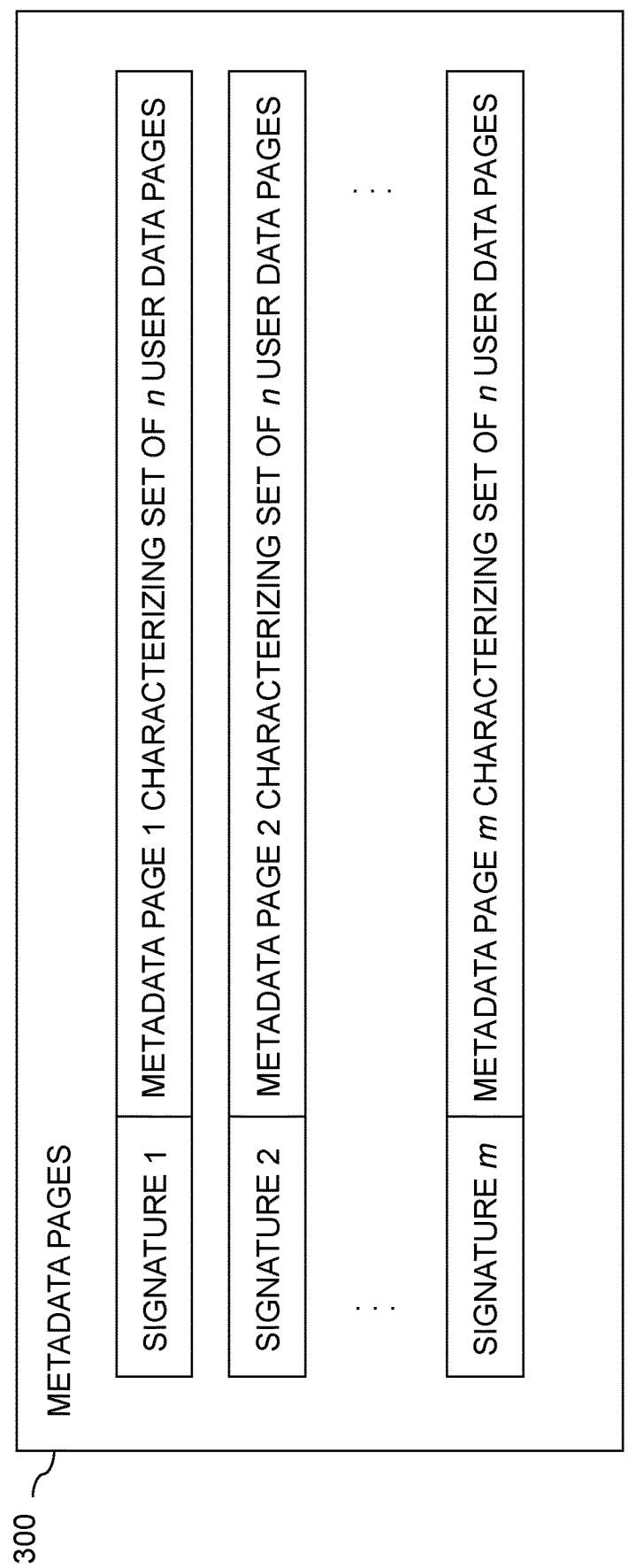
FIG. 3 shows an example of a set of metadata pages in an illustrative embodiment.

This is illustrated in FIG. 3, which shows a given set of metadata pages 300 representing a portion of the metadata pages 110 in an illustrative embodiment. The metadata pages in this example include metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations shown in FIGS. 2 and 3 are examples only, and numerous alternative user data and metadata page configurations can be used in other embodiments.

The content addressable storage system 105 in the FIG. 1 embodiment is implemented as at least a portion of a clustered storage system and includes a plurality of storage nodes 115 each comprising a corresponding subset of the storage devices 106. Other clustered storage system arrangements comprising multiple storage nodes can be used in other embodiments. A given clustered storage system may include not only storage nodes 115 but also additional storage nodes 120 coupled to network 104. Alternatively, the additional storage nodes 120 may be part of another clustered storage system of the system 100. Each of the storage nodes 115 and 120 of the system 100 is assumed to be implemented using at least one processing device comprising a processor coupled to a memory.

The storage controller 108 of the content addressable storage system 105 is implemented in a distributed manner so as to comprise a plurality of distributed storage controller components implemented on respective ones of the storage nodes 115 of the content addressable storage system 105. The storage controller 108 is therefore an example of what is more generally referred to herein as a "distributed storage controller." In subsequent description herein, the storage controller 108 may be more particularly referred to as a distributed storage controller.

Each of the storage nodes 115 in this embodiment further comprises a set of processing modules configured to communicate over one or more networks with corresponding sets of processing modules on other ones of the storage nodes 115. The sets of processing modules of the storage nodes 115 collectively comprise at least a portion of the distributed storage controller 108 of the content addressable storage system 105.

The distributed storage controller 108 in the present embodiment is configured to implement functionality for decrement protection of reference counts for inflight small write requests in the content addressable storage system 105.

As noted above, the storage devices 106 are configured to store user data pages 200 and metadata pages 300 in respective user data page and metadata page areas. Each of the user data pages 200 comprises a logical address and a content-based signature derived from content of that data page, and each of the metadata pages 300 characterizes a plurality of the user data pages 200 and associates the content-based signatures of those user data pages with respective physical blocks in the storage devices 106.

The modules of the distributed storage controller 108 in the present embodiment more particularly comprise different sets of processing modules implemented on each of the storage nodes 115. The set of processing modules of each of the storage nodes 115 comprises at least a control module 108C, a data module 108D and a routing module 108R. The distributed storage controller 108 further comprises one or more management ("MGMT") modules 108M. For example, only a single one of the storage nodes 115 may include a management module 108M. It is also possible that management modules 108M may be implemented on each of at least a subset of the storage nodes 115.

Communication links may be established between the various processing modules of the distributed storage controller 108 using well-known communication protocols such as IP, Transmission Control Protocol (TCP), and remote direct memory access (RDMA). For example, respective sets of IP links used in data transfer and corresponding messaging could be associated with respective different ones of the routing modules 108R.

Ownership of a user data logical address space within the content addressable storage system 105 is illustratively distributed among the control modules 108C.

The cache 109 of storage system 105 in the FIG. 1 embodiment includes write cache entries 109-1, . . . , 109-2 . . . , 109-N which store incoming IO request data for later destaging to storage devices 106. Cache 109 may illustratively comprise volatile memory such as, e.g., random access memory (RAM), dynamic random-access memory (DRAM), static random-access memory (SRAM), or any other kind of volatile memory. In some embodiments, cache 109 may additionally or alternatively comprise any non-volatile memory as described above with respect to storage devices 106. In some embodiments, cache 109 may support a variety of operations or functions of storage system 105 including, for example, write cache, read cache, temporary metadata storage, or other similar operations. While illustrated as a separate component of storage system 105, in some embodiments, cache 109 may be included as a component of storage controller 108. In some aspects, the caches 109 of each storage node 115 may operate together as a single cache 109 of the content addressable storage system 105 where the components of a given storage node 115 may access any portion of the cache 109 including those portions included as components of other storage nodes 115.

It is desirable in these and other storage system contexts to implement functionality for decrement protection of reference counts for inflight small write requests ("decref protection") across multiple distributed processing modules, such as the processing modules 108C, 108D, 108R and 108M of the distributed storage controller 108.

The management module 108M of the storage controller 108 may include decref protection logic 116 that engages corresponding control logic instances in all of the control modules 108C and routing modules 108R in order to implement processes for decrement protection of reference counts for inflight small write requests within the system 100, as will be described in more detail below in conjunction with FIGS. 5A-5C.

In some embodiments, the content addressable storage system 105 comprises an XtremIO™ storage array suitably modified to incorporate techniques for decrement protection of reference counts for inflight small write requests as disclosed herein. In arrangements of this type, the control modules 108C, data modules 108D and routing modules 108R of the distributed storage controller 108 illustratively comprise respective C-modules, D-modules and R-modules of the XtremIO™ storage array. The one or more management modules 108M of the distributed storage controller 108 in such arrangements illustratively comprise decref protection logic 116, although other types and arrangements of system-wide management modules can be used in other embodiments. Accordingly, functionality for decrement protection of reference counts for inflight small write requests in some embodiments is implemented under the control of decref protection logic 116 of the distributed storage controller 108, utilizing the C-modules, D-modules and R-modules of the XtremIO™ storage array.

In the above-described XtremIO™ storage array example, each user data page typically has a size of 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Additional examples of content addressable storage functionality implemented in some embodiments by control modules 108C, data modules 108D, routing modules 108R and management module(s) 108M of distributed storage controller 108 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Each of the storage nodes 115 of the storage system 105 comprises a set of processing modules configured to communicate over one or more networks with corresponding sets of processing modules on other ones of the storage nodes. A given such set of processing modules implemented on a particular storage node illustratively includes at least one control module 108C, at least one data module 108D and at least one routing module 108R, and possibly a management module 108M. These sets of processing modules of the storage nodes collectively comprise at least a portion of the distributed storage controller 108.

The term "write request" as used herein is intended to be broadly construed, so as to encompass one or more IO operations directing that at least one data item of a storage system be written to in a particular manner. A given write request is illustratively received in a storage system from a host device. For example, in some embodiments, a write request is received in a distributed storage controller of the storage system, and directed from one processing module to another processing module of the distributed storage controller. More particularly, in the embodiment to be described below in conjunction with FIGS. 5A-5C, a received write request is directed from a routing module of the distributed storage controller to a particular control module of the distributed storage controller. The write request is stored in the write cache portion of cache 109, acknowledged, and subsequently destaged at a later time to a persistent data storage location on one or more of storage devices 106. Other arrangements for receiving and processing write requests from one or more host devices can be used.

Communications between control modules 108C and routing modules 108R of the distributed storage controller 108 may be performed in a variety of ways. An example embodiment is implemented in the XtremIO™ context, and the C-modules, D-modules and R-modules of the storage nodes 115 in this context are assumed to be configured to communicate with one another over a high-speed internal network such as an InfiniBand network. The C-modules, D-modules and R-modules coordinate with one another to accomplish various IO processing tasks.

The logical block addresses or LBAs of a logical layer of the storage system 105 correspond to respective physical blocks of a physical layer of the storage system 105. The user data pages of the logical layer are organized by LBA and have reference via respective content-based signatures to particular physical blocks of the physical layer.

Each of the physical blocks has an associated reference count 114 that is maintained within the storage system, for example, in storage devices 106. Reference counts 114 may alternatively be stored or maintained in storage controller 108 or other portions of content addressable storage system 105. The reference count 114 for a given physical block indicates the number of logical blocks that point to that same physical block.

In releasing logical address space in the storage system, a dereferencing operation is generally executed for each of the LBAs being released. More particularly, the reference count 114 of the corresponding physical block is decremented. A reference count 114 of zero or another predetermined value, indicates that there are no longer any logical blocks that reference the corresponding physical block, and so that physical block can be released.

The manner in which functionality for decrement protection of reference counts for inflight small write requests is provided in the FIG. 1 embodiment will now be described. The process is assumed to be carried out by the processing modules 108C, 108D, 108R and 108M. It is further assumed that the control modules 108C temporarily store data pages in the cache 109 of the content addressable storage system 105 and later destage the temporarily stored data pages via the data modules 108D in accordance with write requests received from host devices via the routing modules 108R. The host devices illustratively comprise respective ones of the compute nodes 102 of the computer system 101.

The write requests from the host devices identify particular data pages to be written in the storage system 105 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 105 utilizes a two-level mapping process to map logical block addresses to physical block addresses. The first level of mapping uses an address-to-hash ("A2H") table and the second level of mapping uses a hash-to-physical ("H2P") table, sometimes known as a hash metadata ("HMD") table, with the A2H and H2P tables corresponding to respective logical and physical layers of the content-based signature mapping within the storage system 105.

The first level of mapping using the A2H table associates logical addresses of respective data pages with respective content-based signatures of those data pages. This is also referred to as logical layer mapping.

The second level of mapping using the H2P table associates respective ones of the content-based signatures with respective physical storage locations in one or more of the storage devices 106. This is also referred to as physical layer mapping.

For a given write request, both of the corresponding A2H and H2P tables are updated in conjunction with the processing of that write request. For example, the A2H table may be updated when the page data for the write request is stored in cache 109 and the H2P table may be updated when the page data is hardened to storage devices 106 during a destaging process.

The A2H and H2P tables described above are examples of what are more generally referred to herein as "mapping tables" of respective first and second distinct types. Other types and arrangements of mapping tables or other content-based signature mapping information may be used in other embodiments.

The reference counts 114 mentioned above are illustratively maintained for respective physical blocks in the storage devices 106 and each such reference count 114 indicates for its corresponding physical block the number of logical blocks that point to that same physical block. When all logical block references to a given physical block are removed, the reference count 114 for that physical block becomes zero or another predetermined value, and its capacity can be released. A given "dereferencing operation" as that term is broadly used herein is intended to encompass decrementing of a reference count 114 associated with a physical block.

As mentioned previously, in conjunction with release of logical address space in the storage system 105, the storage controller 108 makes the released logical address space available to users, executes dereferencing operations for respective ones of the physical blocks corresponding to the released logical address space, and releases any physical capacity for which the corresponding reference counts 114 reach zero or another predetermined value.

Techniques for efficient release of logical and physical capacity in a storage system such as storage system 105 are disclosed in U.S. patent application Ser. No. 15/884,577, filed Jan. 31, 2018 and entitled "Storage System with Decoupling and Reordering of Logical and Physical Capacity Removal," which is incorporated by reference herein. Such techniques may be utilized in illustrative embodiments disclosed herein, but are not required in any particular illustrative embodiment.

The logical address space illustratively comprises one or more ranges of logical block addresses or LBAs each comprising a LUN ID and an offset. For example, each LBA can identify a particular one of the user data pages 200. The LBAs each correspond to one or more physical blocks in the storage devices 106. Other types of LBAs and logical address spaces can be used in other embodiments. The term "logical address" as used herein is therefore intended to be broadly construed.

A given such logical address space may be released responsive to deletion of a corresponding storage volume, snapshot or any other arrangement of data stored in the storage system 105. Other conditions within the storage system 105 can also result in release of logical address space including, for example, snapshot merges, write shadows, or other conditions.

The storage controller 108 illustratively makes the released logical address space available to users in order of released logical address. More particularly, the storage controller 108 can make the released logical address space available to users in order of released logical address by making each of its corresponding released logical addresses immediately available responsive to that logical address being released. For example, release of one or more LBAs or a range of LBAs by one or more users can result in those LBAs being made available to one or more other users in the same order in which the LBAs are released.

The corresponding physical blocks may be released in a different order, through accumulation and reordered execution of dereferencing operations as described in the above-cited U.S. patent application Ser. No. 15/884,577. For example, the storage controller 108 in some embodiments accumulates multiple dereferencing operations for each of at least a subset of the metadata pages 300, and executes the accumulated dereferencing operations for a given one of the metadata pages 300 responsive to the accumulated dereferencing operations for the given metadata page reaching a threshold number of dereferencing operations.

In executing the accumulated dereferencing operations for the physical blocks, execution of each of the dereferencing operations more particularly involves decrementing a reference count 114 of a corresponding one of the physical blocks, and releasing the physical block responsive to the reference count 114 reaching a designated number, such as zero. Moreover, in executing the accumulated dereferencing operations for the physical blocks, at least a subset of the accumulated dereferencing operations are first reordered into an order that more closely matches a physical layout of the corresponding physical blocks on the storage devices 106. The reordered dereferencing operations are then executed in that order.

As a result, the physical blocks may be released in the storage system 105 in a different order than that in which their corresponding logical blocks are released. This provides a number of significant advantages as outlined in the above-cited U.S. patent application Ser. No. 15/884,577.

Other embodiments can be configured to release physical capacity in other ways. For example, physical capacity in some embodiments can be released in the same order in which logical capacity is released.

As indicated above, the storage controller 108, illustratively comprising the modules 108C, 108R and 108M as illustrated in FIG. 1 as well as additional modules such as data modules 108D, is configured to implement functionality for decrement protection of reference counts for inflight small write requests in the content addressable storage system 105.

Execution of a small write IO request received in the storage system 105 from a host device illustratively involves the following operations:

1. A synchronous part where the new segment of data is persisted in the write cache portion of cache 109 and the IO request is acknowledged.

2. An asynchronous part that destages the new data segment by a background destager. The construction and hardening of the new data page is done in this stage by combining the target data page, e.g., the data page located on storage devices 106 at the mapped location corresponding to the content-based signature, and the new data segment stored in write cache during the synchronous part. The content-based signature of the target data page may be determined, for example, based on the received small write IO request which may specify an address, e.g., LUN+ offset. Using the A2H table, the content-based signature of the target data page may be determined.

Since the target data page is combined with the new data segment during destaging of the write cache for the small write IO request, it is important that the target data page is not removed until a new data page generated based on the combined target data page and new data segment has been hardened as a new data page in the storage devices 106. For example, the reference count of the target data page should not be decremented to zero or another predetermined value while a new data segment targeting the data page is currently pending destaging, e.g., an inflight small write IO request.

As mentioned above, every data page stored in storage devices 106 has a reference count 114 that counts the number of references to the page in the A2H mapping. A page is removed when its reference count 114 is decremented to zero or another predetermined value. The storage controller 108 is responsible for the update of the reference counts 114 by sending increment ("Incref") and decrement ("Decref") commands to the storage devices 106. Page reference counts 114 are generally decremented when overwriting an address and when volumes are deleted.

However, there are also logical volume management (LVM) flows that may not be aware of write cache dependencies and can issue a Decref request for a data page even when there are inflight small write IO request transactions referencing the content-based signature of the data page, e.g., the content-based signature of the data page targeted by the small write IO request. For example, the LVM component may detect that the content-based signature was fully shadowed by all the snapshots that were originated from an origin snapshot in a snapshot tree, and consequently initiate a decrement request to the reference count 114 corresponding to this content-based signature. If such decrement command is executed and reduces the reference count 114 of the target data page to zero or another predetermined value, the target data page may be deleted. However, if there are inflight small write IO requests for a shadow write of this content-based signature, a new data page for this small write IO request could not be constructed, since the target data page required for its construction has been deleted. Hence such types of flows may result in data loss.

One solution that prevents the reference count of the target data page from decrementing to zero or another predetermined value while there is an inflight small write IO request targeting the data page is to increment the reference count of the target data page for any inflight small write IO requests that target the data page. However, this solution may waste a significant amount of processing resources since such an increment operation on the reference count of the target data page would be performed for every small write IO request, regardless of whether the reference count of the target data page will be decremented by the storage controller 108 while the destaging of the small write IO request is pending. In addition, performing an increment operation on the reference count of the target data page for each inflight small write IO request may also increase IO latency as an additional operation must be performed during the synchronous part of each IO request process and may be performed on a reference count located at a different node thus wasting network resources.

In an illustrative embodiment, decref protection logic 116 is disclosed that addresses these issues by preventing the target data page from being deleted before all related small write IO request transactions targeting that data page are completed, e.g., by persisting a new data page to the storage devices 106. The decref protection logic 116 postpones a Decref request issued by the storage controller 108 for a data page associated with a content-based signature if the data page is referenced by any inflight small write IO request transactions, until all corresponding inflight small write IO request transactions are completed.

In some illustrative embodiments, only the first Decref transaction for the data page associated with the content-based signature may be postponed. In this embodiment, any subsequent Decref transactions may be executed normally. For example, since postponing even a single Decref transaction will prevent the reference count from being decremented to zero or another predetermined value and the target data page from being deleted, only one Decref transaction need be postponed to ensure that the target data page does not get deleted.

In some illustrative embodiments, all Decref transactions for the data page associated with the content-based signature may be postponed. For example, in this embodiment, no Decref transactions for a target data page may be allowed to proceed when an inflight write IO request targets that data page.

With reference now to FIGS. 1 and 4, in some illustrative embodiments, a given instance of storage controller 108 comprises decref protection logic 116, an associated decref hash table 400, and an associated decref journal 118. Decref protection logic 116 implements a process for decrement protection of reference counts for data pages targeted by inflight small write IO requests that are smaller in size than the page granularity of the system. For example, the decref protection logic 116 may postpone a Decref transaction that would otherwise decrement the reference count 114 for a data page targeted by a small write IO request to zero or another predetermined value.

Decref hash table 400 stores an inflight write count 404 and a decref postponed flag 406 corresponding to a content-based signature 402, e.g., hash digest or hash handle, associated with a data page targeted by an inflight small write IO request. For example, the content-based signature 402 may be used as an index into decref hash table 400 to access the inflight write count 404 and decref postponed flag 406 corresponding to the target data page. In an illustrative embodiment, decref hash table 400 may be stored in a volatile memory of controller 108, in cache 109, or in other storage of system 105. While decref hash table 400 is described as a hash table in the illustrative embodiment, any other data structure may be used to store the content-based signature 402, inflight write count 404, and decref postponed flag 406.

Inflight write count 404 is a counter that reflects the number of inflight small write IO request transactions that are overwriting the target data page.

Decref postponed flag 406 is a flag indicating whether or not a Decref transaction was postponed.

Decref journal 118 is a data structure that is stored persistently, for example, NVRAM of storage system 105, in storage devices 106, or any other persistent storage associated with storage system 105, and is configured to store a content-based signature for a postponed Decref transaction.

An example process that occurs when a small write IO request is received may be implemented as follows:

1. On receipt of a small write IO request, the content-based signature 402, e.g., hash digest, hash handle, or other content-based signature, of the data page targeted by the small write IO request may be used as an index into the decref hash table 400:
   a. If the content-based signature 402 for the target data page already exists in the decref hash table 400, increment the inflight write count 404 corresponding to that content-based signature 402.
   b. If the content-based signature 402 doesn't exist in the decref hash table 400, add an entry for the content-based signature 402 in the decref hash table 400, set the corresponding inflight write count 404 to 1, and clear the decref postponed flag 406.
2. When a Decref request is issued by storage controller 108, the Decref request is either executed or postponed according to the following logic:
   I. If the content-based signature 402 is found in the decref hash table 400, e.g., there are inflight small write IO requests targeting the data page corresponding to that content-based signature 402:
      a. If the decref postponed flag 406 is cleared:
         i. Add the Decref request to the decref journal 118 for later execution (e.g., adding the content-based signature associated with the decref request as an entry in the decref journal 118).
         ii. Set the decref postponed flag 406 corresponding to the content-based signature 402 in the decref hash table 400.
      b. Else (i.e. decref postponed flag 406 is already set):
         i. Execute the Decref request by decrementing the reference count 114 for the data page corresponding to the content-based signature 402.

In some embodiments, when the decref postponed flag 406 is already set, additional Decref requests may also be written to the decref journal 118, e.g., accumulated for later execution in decrementing the reference count 114 of the target data page corresponding to the content-based signature 402.

3. On completion of a small write IO Request:
   a. Decrement the inflight write count 404 in the decref hash table 400 corresponding to the content-based signature 402 of the data page targeted by the small write IO request.
   b. If inflight write count 404 is decremented to zero or another predetermined value, and decref postponed flag 406 is set (i.e. a Decref request was postponed):
      i. Remove the Decref request from the decref journal 118.
      ii. Remove the hash table entry of the decref hash table 400 corresponding to the content-based signature 402 of the data page.
      iii. Execute the Decref request for the target data page corresponding to the content-based signature 402, e.g., decrementing the reference count 114 for the target data page in storage devices 106.
4. On recovery (e.g., after a system failure due to power outage or other event): restore the decref hash table 400 by:
   a. Resetting the decref hash table 400, e.g., by clearing out any data stored in the hash table or resetting the decref hash table 400 to its original initialization state.
   b. Analyzing any recovered write cache transactions, inserting the corresponding content-based signatures 402 to be protected into the decref hash table 400, e.g., the content-based signatures targeted by any recovered small write IO requests, and incrementing the corresponding inflight write count 404 for each small write IO request targeting a corresponding content-based signature 402.
   c. Analyze any recovered Decref request entries from decref journal 118 and set the corresponding Decref postpone flag 406 in the decref hash table 400.

The decref protection logic 116 described above guarantees that a data page is not removed (i.e. decremented to zero or another predetermined value) until all inflight small write IO request transactions referencing it are successfully completed, and thus guarantees the consistency of the second stage of the IO flow. In addition, since the protection occurs in response to a Decref request instead of for each IO request, waste of processing resources may be reduced and IO latency may be preserved.

The above-described decrement protection of reference counts for inflight small write requests functionality of the storage controller 108 is carried out under the control of the decref protection logic 116 of the storage controller 108, operating in conjunction with corresponding control 108C and routing 108R modules, to access the data modules 108D. The modules 108C, 108D, 108R and 108M of the distributed storage controller 108 therefore collectively implement an illustrative process for decrement protection of reference counts for inflight small write requests of content addressable storage system 105.

It should also be understood that the particular arrangement of storage controller processing modules 108C, 108D, 108R and 108M as shown in the FIG. 1 embodiment is presented by way of example only. Numerous alternative arrangements of processing modules of a distributed storage controller may be used to implement functionality for decrement protection of reference counts for inflight small write requests in a clustered storage system in other embodiments.

Although illustratively shown as being implemented within the content addressable storage system 105, the storage controller 108 in other embodiments can be implemented at least in part within the computer system 101, in another system component, or as a stand-alone component coupled to the network 104.

The computer system 101 and content addressable storage system 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

As a more particular example, the storage controller 108 can be implemented in the form of one or more LXCs running on one or more VMs. Other arrangements of one or more processing devices of a processing platform can be used to implement the storage controller 108. Other portions of the system 100 can similarly be implemented using one or more processing devices of at least one processing platform.

The computer system 101 and the content addressable storage system 105 may be implemented on respective distinct processing platforms, although numerous other arrangements are possible. For example, in some embodiments, at least portions of the computer system 101 and the content addressable storage system 105 are implemented on the same processing platform. The content addressable storage system 105 can therefore be implemented at least in part within at least one processing platform that implements at least a subset of the compute nodes 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the cluster reside in one or more other data centers in one or more other geographic locations that are potentially remote from the first geographic location. Thus, it is possible in some implementations of the system 100 for different ones of the compute nodes 102 to reside in different data centers than the content addressable storage system 105. Numerous other distributed implementations of one or both of the computer system 101 and the content addressable storage system 105 are possible. Accordingly, the content addressable storage system 105 can also be implemented in a distributed manner across multiple data centers.

It is to be appreciated that these and other features of illustrative embodiments are presented by way of example only, and should not be construed as limiting in any way.

Accordingly, different numbers, types and arrangements of system components such as computer system 101, compute nodes 102, network 104, content addressable storage system 105, storage devices 106, storage controller 108 and storage nodes 115 and 120 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, in some illustrative embodiments a given content addressable storage system or other type of storage system with functionality for decrement protection of reference counts for inflight small write requests can be offered to cloud infrastructure customers or other users as a PaaS offering.

Additional details of illustrative embodiments will be described below with reference to the flow diagrams of FIGS. 5A-5C. FIGS. 5A-5C more particularly show example processes for decrement protection of reference counts for inflight small write requests implemented in storage system such as content addressable storage system 105 of the FIG. 1 embodiment. The content addressable storage system 105 may comprise a scale-out all-flash storage array such as an XtremIO™ storage array. A given such storage array can be configured to provide storage redundancy using well-known RAID techniques such as RAID 5 or RAID 6, although other storage redundancy configurations can be used.

The term "storage system" as used herein is therefore intended to be broadly construed, and should not be viewed as being limited to content addressable storage systems or flash-based storage systems.

The storage devices of such a storage system illustratively implement a plurality of LUNs configured to store files, blocks, objects or other arrangements of data.

A given storage system can be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or LXCs, or combinations of both as in an arrangement in which Docker containers or other types of LXCs are configured to run on VMs.

As a more particular example, components of a distributed storage controller can each be implemented in the form of one or more LXCs running on one or more VMs. Other arrangements of one or more processing devices of a processing platform can be used to implement a distributed storage controller and/or its components. Other portions of the information processing system 100 can similarly be implemented using one or more processing devices of at least one processing platform.

The term "processing platform" as used herein is intended to be broadly construed so as to encompass, by way of illustration and without limitation, multiple sets of processing devices and associated storage systems that are configured to communicate over one or more networks.

The operation of the information processing system 100 will now be further described with reference to the flow diagrams of the illustrative embodiment of FIGS. 5A-5C. The process as shown in FIG. 5A includes steps 502 through 508 and illustrates a synchronous portion of the small write request, e.g., the temporary storage of the data segment associated with the small write request in cache 109. The process as shown in FIG. 5B includes steps 510 through 518 and illustrates the functionality that occurs when a decref request is received. The process as shown in FIG. 5C includes steps 520 through 532 and illustrates an asynchronous portion of the small write request, e.g., the destaging of the data segment associated with the small write request from cache 109 into storage devices 106. The processes shown in FIGS. 5A-5C are suitable for use in the system 100 but is more generally applicable to other types of information processing systems each comprising one or more storage systems. The steps are illustratively performed by cooperative interaction of control logic instances of processing modules of a distributed storage controller. A given such storage controller can therefore comprise a distributed storage controller implemented in the manner illustrated in FIGS. 1-4.

With reference now to FIG. 5A, the synchronous portion of the small write request will now be described.

In step 502, small write IO requests are received by storage controller 108, for example, from computer system 101 or other host devices. The small write IO requests may include write requests for data segments that are smaller than the page granularity of the storage devices 106. In some embodiments, the storage controller 108 may generate one or more IO threads to service the small write IO requests.

In step 504, the content-based signatures of data pages targeted by the received small write IO requests may be determined, for example, as described above.

In step 506, the IO threads may store the data segments included in the small write IO requests in cache 109.

In step 508, the inflight write count 404 stored in decref hash table 400 may be incremented for the content-based signatures corresponding to any data pages targeted by the small write IO requests.

Figure 5B:
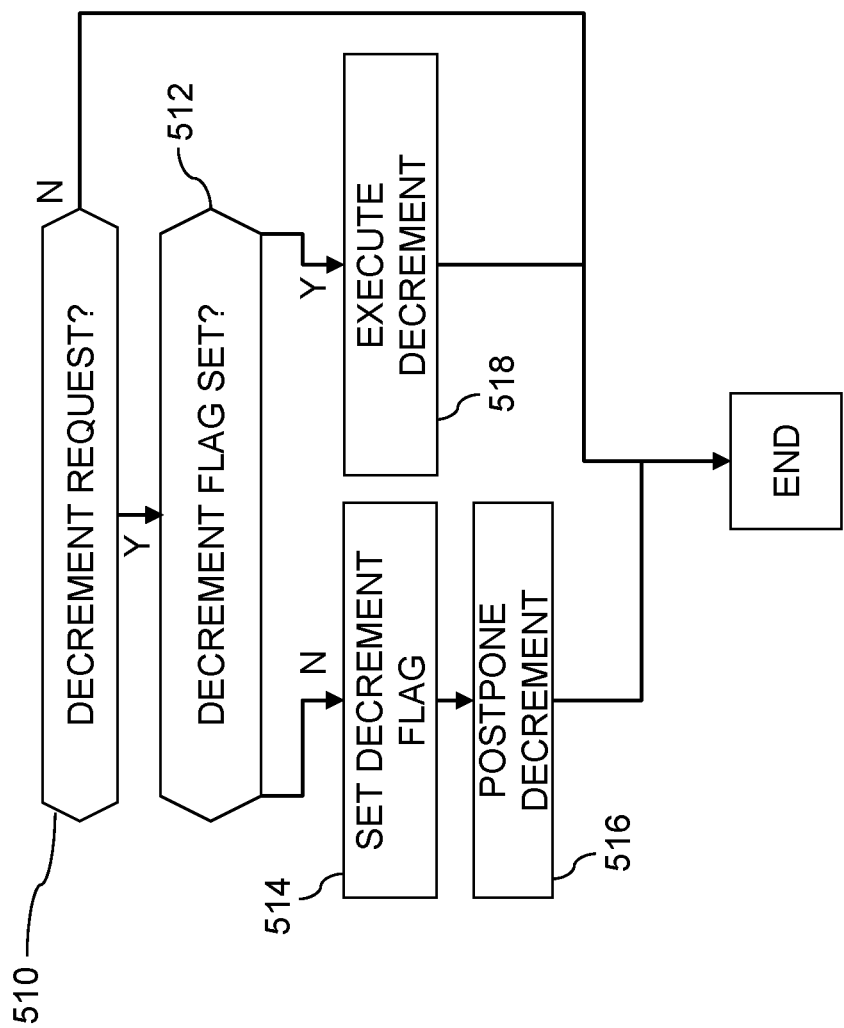

With reference now to FIG. 5B, the decref request functionality will now be described.

In step 510, storage controller 108 may determine whether a decrement request has been issued. In some embodiments, the decrement request may be issued by the controller 108 in response to another operation. In some embodiments, the decrement request may be issued by another controller associated with storage controller 108 and received by storage controller 108, e.g., as part of a distributed system. If no decrement request has been issued, the process ends.

In step 512, in response to a decrement request being issued, the storage controller determines whether the decref postponed flag 406 has been set for the corresponding content-based signature 402 in decref hash table 400.

In step 514, if the decref postponed flag 406 for the corresponding content-based signature has not been set in decref hash table 400, the decref postponed flag 406 is set and the decrement request is postponed in step 516 and the process ends.

In step 518, if the decref postponed flag 406 was determined to already be set in step 512, the decrement request is executed, e.g., the reference count is decremented, and the process ends.

Figure 5C:
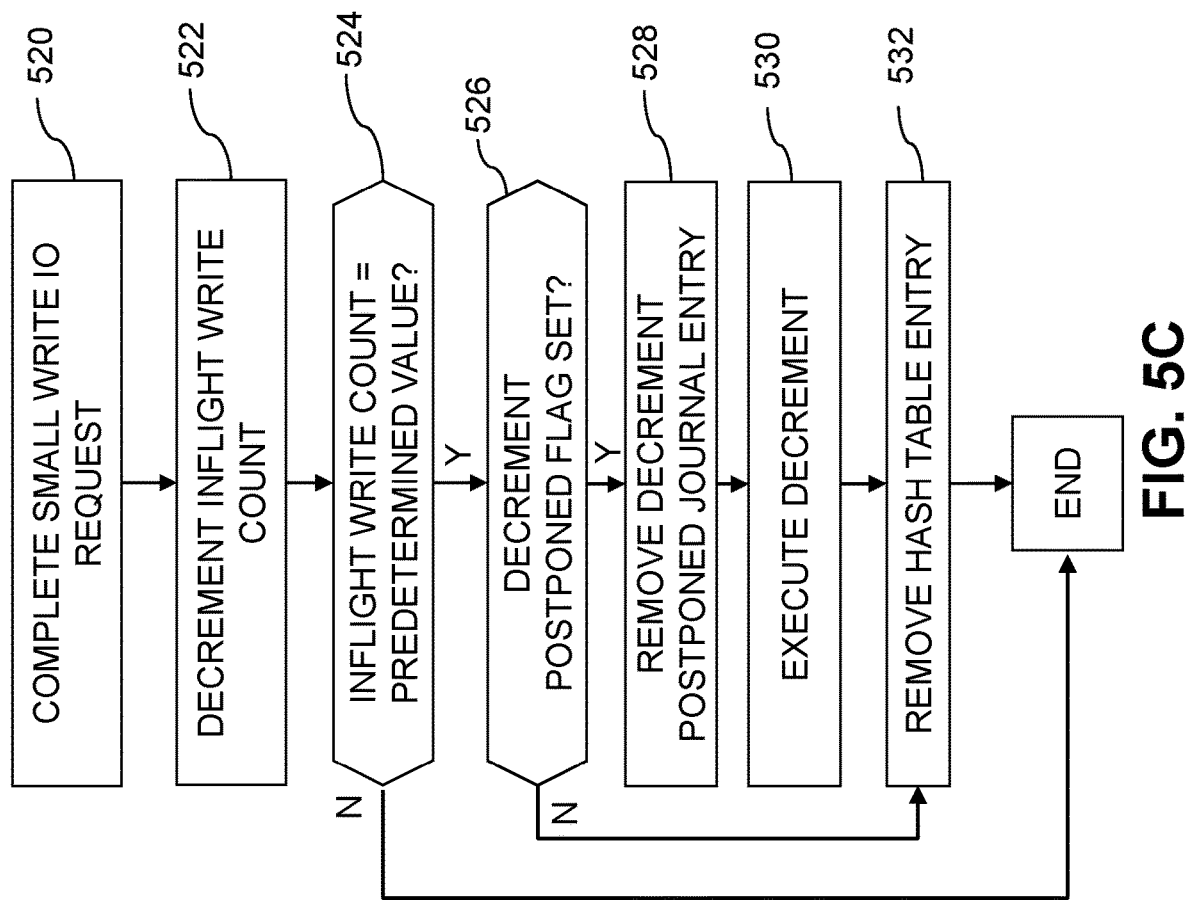

With reference now to FIG. 5C, the asynchronous portion of the small write request will now be described.

In step 520, storage controller 108 completes an inflight write IO request, e.g., by performing destaging on the data segment associated with the inflight small write IO request that is stored in the cache 109. For example, the data segment associated with the small write IO request is combined with the target data page and the combined data page may be persisted in storage devices 106.

In step 522, in response to completion of a small write IO request, the storage controller 108 decrements the inflight write count 404 stored in decref hash table 400 at the content-based signature 402 corresponding to the target data page associated with the completed destaged small write IO request.

In step 524, the storage controller 108 determines whether the inflight write count 404 has been decremented to zero or to another predetermined value. If the inflight write count 404 has not been decremented to zero or to another predetermined value, the process ends.

In step 526, if the inflight write count 404 has been decremented to zero or to another predetermined value, storage controller 108 determines whether the decref postponed flag 406 for the corresponding content-based signature is set.

In step 528, the storage controller 108 removes the entry corresponding to the decref request from the decref journal 118, e.g., the content-based signature of the target data page may be removed from the decref journal 118.

In step 530, if the decref postponed flag 406 for the corresponding content-based signature is set the storage controller 108 executes the decrement request.

In step 532, the storage controller 108 removes the hash table entry included in the decref hash table 400 for corresponding content-based signature. The process then ends.

Referring back to step 526, if the decref postponed flag 406 is not set, the process proceeds to step 532 and the storage controller 108 removes the hash table entry included in decref hash table 400 for corresponding content-based signature.

It is also to be appreciated that the processes of FIGS. 5A-5C and other features and functionality for decrement protection of reference counts for inflight small write requests as described above can be adapted for use with other types of information systems, including by way of example an information processing system in which the host devices and the storage system are both implemented on the same processing platform.

The particular processing operations and other system functionality described in conjunction with the flow diagrams of FIGS. 5A-5C are presented by way of illustrative example only and should not be construed as limiting the scope of the disclosure in any way. Alternative embodiments can use other types of processing operations for implementing decrement protection of reference counts for inflight small write requests. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different process instances for decrement protection of reference counts for inflight small write requests for respective different storage systems or portions thereof within a given information processing system.

Functionality such as that described in conjunction with the flow diagrams of FIGS. 5A-5C can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 108 that is configured to control performance of one or more steps of the processes of FIGS. 5A-5C can be implemented as part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. The storage controller 108, as well as other system components, may be implemented at least in part using processing devices of such processing platforms. For example, in a distributed implementation of the storage controller 108, respective distributed modules of such a storage controller can be implemented in respective LXCs running on respective ones of the processing devices of a processing platform.

In some embodiments, the storage system comprises an XtremIO™ storage array suitably modified to incorporate techniques for decrement protection of reference counts for inflight small write requests as disclosed herein.

As described previously, in the context of an XtremIO™ storage array, the control modules 108C, data modules 108D, routing modules 108R and management module(s) 108M of the distributed storage controller 108 in system 100 illustratively comprise C-modules, D-modules, R-modules and SYM module(s), respectively. These exemplary processing modules of the distributed storage controller 108 can be configured to implement functionality for decrement protection of reference counts for inflight small write requests in accordance with the processes of FIGS. 5A-5C.

The techniques for decrement protection of reference counts for inflight small write requests implemented in the embodiments described above can be varied in other embodiments. For example, different types of process operations can be used in other embodiments.

In addition, the above-described functionality associated with C-module, D-module, R-module and decref protection logic components of an XtremIO™ storage array can be incorporated into other processing modules or components of a centralized or distributed storage controller in other types of storage systems.

Illustrative embodiments of content addressable storage systems or other types of storage systems with functionality for decrement protection of reference counts for inflight small write requests as disclosed herein can provide a number of significant advantages relative to conventional arrangements.

For example, some embodiments can advantageously inhibit the deletion of data pages that are required for inflight write IO requests which prevents data loss. In addition, some embodiments can advantageously reduce IO processing waste and latency, for example, by removing the need to increment the reference count for every data page having an associated pending write IO request and instead only postponing decrement requests specifically targeting data pages with inflight write IO requests.

These and other embodiments include clustered storage systems comprising storage controllers that are distributed over multiple storage nodes. Similar advantages can be provided in other types of storage systems.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as storage system 105, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
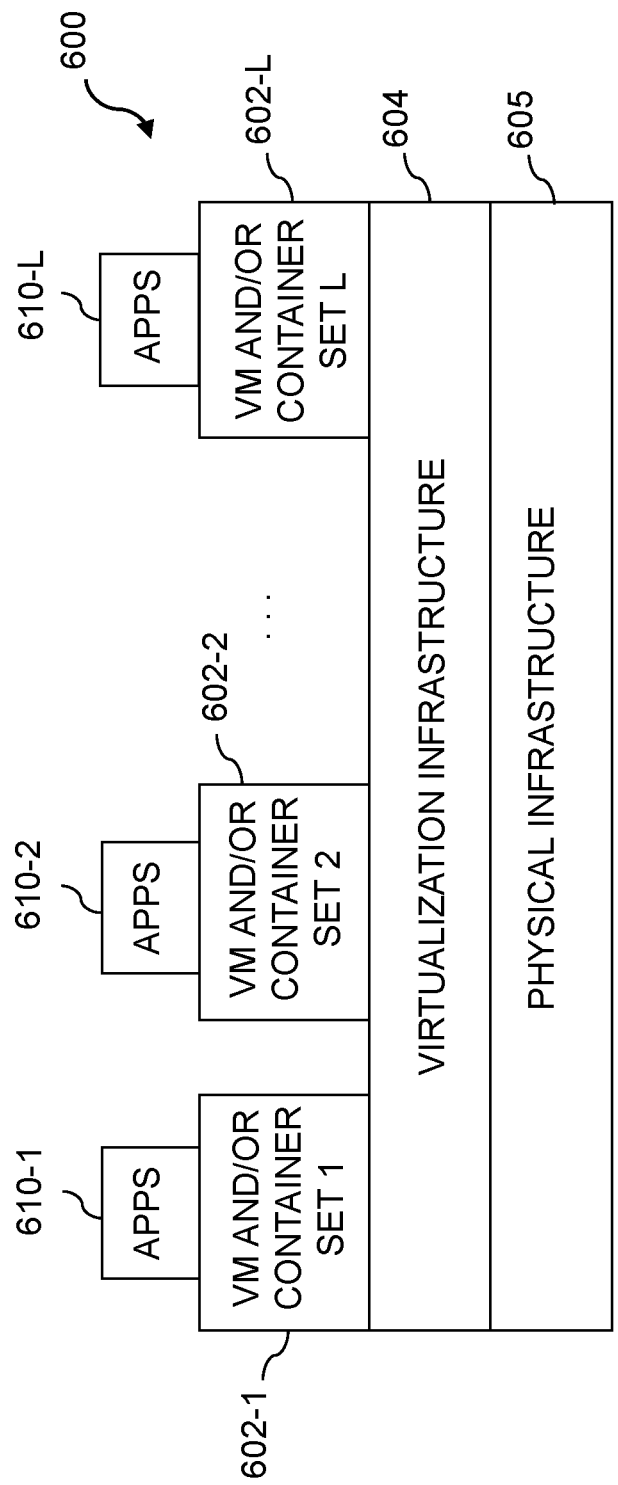
FIGS. 6 and 7 show examples of processing platforms that may be utilized to implement at least a portion of an information processing system in illustrative embodiments.
Figure 7:
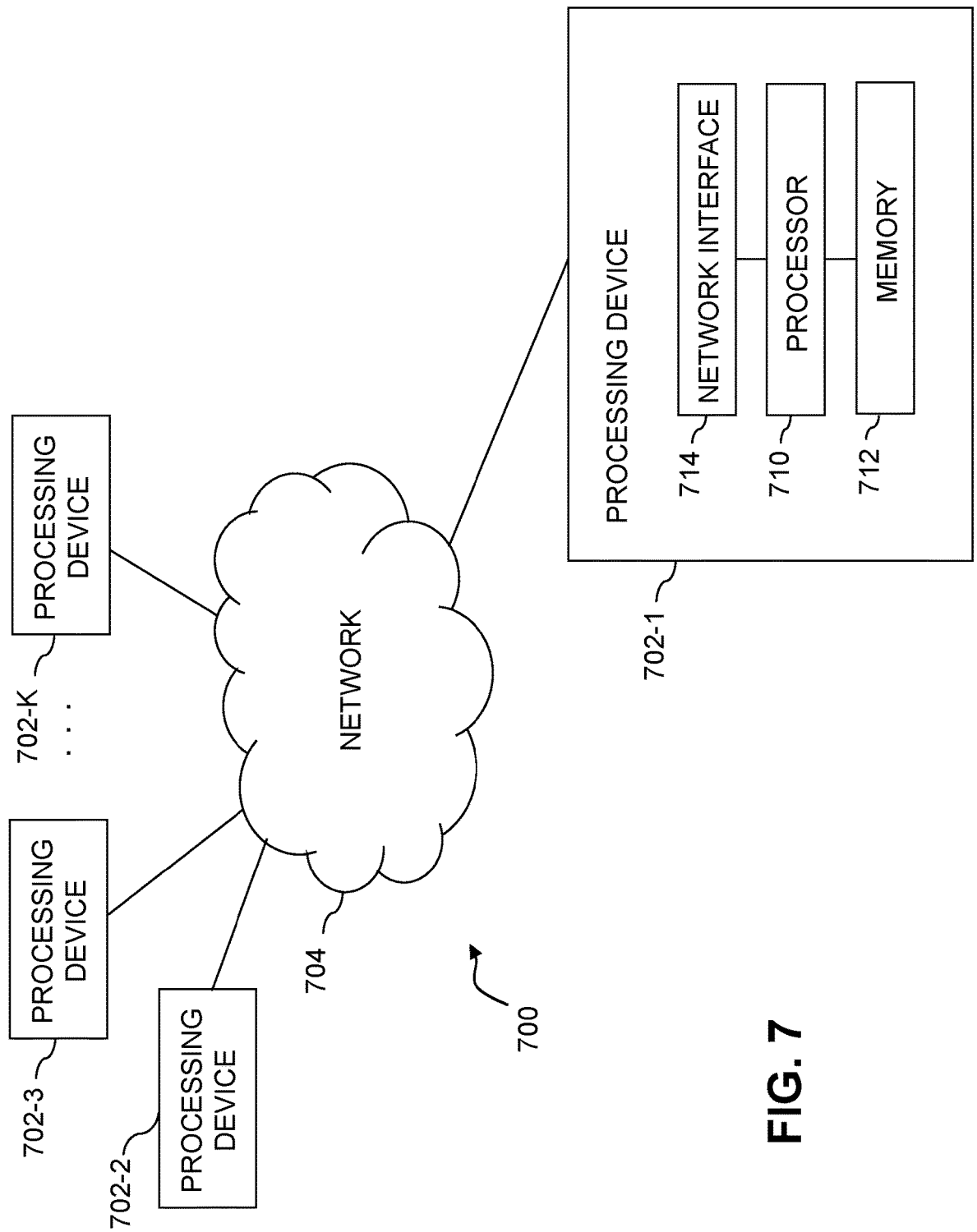

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide metadata loading control functionality of the type described above for one or more processes running on a given one of the VMs. For example, each of the VMs can implement metadata loading control functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide metadata load control functionality of the type described above for one or more processes running on different ones of the containers. For example, a container host device supporting multiple containers of one or more container sets can implement one or more instances of metadata load control logic for use in loading metadata into cache during a restart process.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that, in other embodiments, different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the storage controller 108 of system 100 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, storage nodes, storage devices, storage controllers, processing modules, decrement protection processes and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory, the at least one processing device being configured:
to receive a decrement request to decrement a reference count of a physical location corresponding to a content-based signature of a target data page stored in a storage system comprising a plurality of storage devices;
to determine whether or not a write request which is associated with the target data page is pending, the write request comprising a data segment that is smaller than a page granularity of the plurality of storage devices; and
to postpone the decrement request based at least in part on a determination that the write request is pending.

2. The apparatus of claim 1, wherein determining whether or not the write request which is associated with the target data page is pending comprises determining that an inflight write count that corresponds to the content-based signature of the target data page has a first value, the inflight write count being stored in a data structure associated with the at least one processing device.

3. The apparatus of claim 2, wherein the at least one processing device is further configured:
to determine that the inflight write count has been changed to a second value; and
to execute the postponed decrement request based at least in part on the determination that the inflight write count has been changed to the second value.

4. The apparatus of claim 3, wherein determining that the inflight write count has been changed to the second value comprises determining that an entry in the data structure corresponding to the content-based signature of the target data page has been removed from the data structure.

5. The apparatus of claim 2, wherein the at least one processing device is further configured to set a decrement postponed flag corresponding to the content-based signature of the target data page in the data structure associated with the at least one processing device based at least in part on the receipt of the decrement request and the determination that the inflight write count that corresponds to the content-based signature of the target data page has the first value.

6. The apparatus of claim 5, wherein the at least one processing device is further configured:
to receive a second decrement request to decrement the reference count of the physical location corresponding to the content-based signature of the target data page;
to determine that the decrement postponed flag corresponding to the content-based signature of the target data page is set in the data structure; and
to decrement the reference count of the physical location corresponding to the content-based signature of the target data page based at least in part on the determination that the decrement postponed flag corresponding to the content-based signature of the target data page is set.

7. The apparatus of claim 5, wherein postponing the decrement request comprises storing the decrement request in a decrement request postponed journal in correspondence with the content-based signature of the target data page.

8. The apparatus of claim 7, wherein in response to a recovery of the storage system after an event, the at least one processing device is configured:
to reset the data structure;
to determine whether or not any recovered write requests include a data segment smaller than the page granularity of the plurality of storage devices;
for a given write request that includes a data segment smaller than the page granularity of the plurality of storage devices, to increment the inflight write count corresponding to the content-based signature of a data page targeted by the given write request in the data structure;
to determine whether or not the decrement request postponed journal includes a decrement request corresponding to the content-based signature of the data page targeted by the given write request; and
to set a decrement postponed flag corresponding to the content-based signature of the data page targeted by the given write request in the data structure based at least in part on a determination that the decrement request postponed journal includes the decrement request corresponding to the content-based signature of the data page targeted by the given write request.

9. A method comprising:
receiving a decrement request to decrement a reference count of a physical location corresponding to a content-based signature of a target data page stored in a storage system comprising a plurality of storage devices;
determining whether or not a write request which is associated with the target data page is pending, the write request comprising a data segment that is smaller than a page granularity of the plurality of storage devices; and
postponing the decrement request based at least in part on a determination that the write request is pending, wherein the method is implemented by at least one processing device comprising a processor coupled to a memory.

10. The method of claim 9, wherein determining whether or not the write request which is associated with the target data page is pending comprises determining that an inflight write count that corresponds to the content-based signature of the target data page has a first value, the inflight write count being stored in a data structure associated with the at least one processing device.

11. The method of claim 10, wherein the method further comprises:
determining that the inflight write count has been changed to a second value; and
executing the postponed decrement request based at least in part on the determination that the inflight write count has been changed to the second value.

12. The method of claim 11, wherein determining that the inflight write count has been changed to the second value comprises determining that an entry in the data structure corresponding to the content-based signature of the target data page has been removed from the data structure.

13. The method of claim 10, wherein the method further comprises setting a decrement postponed flag corresponding to the content-based signature of the target data page in the data structure associated with the at least one processing device based at least in part on the receipt of the decrement request and the determination that the inflight write count that corresponds to the content-based signature of the target data page has the first value.

14. The method of claim 13, wherein method further comprises:
receiving a second decrement request to decrement the reference count of the physical location corresponding to the content-based signature of the target data page;
determining that the decrement postponed flag corresponding to the content-based signature of the target data page is set in the data structure; and
decrementing the reference count of the physical location corresponding to the content-based signature of the target data page based at least in part on the determination that the decrement postponed flag corresponding to the content-based signature of the target data page is set.

15. The method of claim 13, wherein postponing the decrement request comprises storing the decrement request in a decrement request postponed journal in correspondence with the content-based signature of the target data page.

16. The method of claim 15, wherein in response to a recovery of a storage system comprising the plurality of storage devices after an event, the method further comprises:
resetting the data structure;
determining whether or not any recovered write requests include a data segment smaller than the page granularity of the plurality of storage devices;
for a given write request that includes a data segment smaller than the page granularity of the plurality of storage devices, incrementing the inflight write count corresponding to the content-based signature of a data page targeted by the given write request in the data structure;
determining whether or not the decrement request postponed journal includes a decrement request corresponding to the content-based signature of the data page targeted by the given write request; and
setting a decrement postponed flag corresponding to the content-based signature of the data page targeted by the given write request in the data structure based at least in part on a determination that the decrement request postponed journal includes the decrement request corresponding to the content-based signature of the data page targeted by the given write request.

17. A computer program product comprising a non-transitory processor-readable storage medium having stored therein program code of one or more software programs, wherein the program code when executed by at least one processing device causes the at least one processing device:
to receive a decrement request to decrement a reference count of a physical location corresponding to a content-based signature of a target data page stored in a storage system comprising a plurality of storage devices;
to determine whether or not a write request which is associated with the target data page is pending, the write request comprising a data segment that is smaller than a page granularity of the plurality of storage devices; and
to postpone the decrement request based at least in part on a determination that the write request is pending.

18. The computer program product of claim 17:
wherein determining whether or not the write request which is associated with the target data page is pending comprises determining that an inflight write count that corresponds to the content-based signature of the target data page has a first value, the inflight write count being stored in a data structure associated with the at least one processing device; and
wherein the program code when executed by at least one processing device further causes the at least one processing device to set a decrement postponed flag corresponding to the content-based signature of the target data page in the data structure associated with the at least one processing device based at least in part on the receipt of the decrement request and the determination that the inflight write count that corresponds to the content-based signature of the target data page has the first value.

19. The computer program product of claim 18, wherein the program code when executed by at least one processing device further causes the at least one processing device:
to receive a second decrement request to decrement the reference count of the physical location corresponding to the content-based signature of the target data page;
to determine that the decrement postponed flag corresponding to the content-based signature of the target data page is set in the data structure; and
to decrement the reference count of the physical location corresponding to the content-based signature of the target data page based at least in part on the determination that the decrement postponed flag corresponding to the content-based signature of the target data page is set.

20. The computer program product of claim 18:
wherein postponing the decrement request comprises storing the decrement request in a decrement request postponed journal in correspondence with the content-based signature of the target data page; and
wherein the program code when executed by at least one processing device further causes the at least one processing device:
to reset the data structure;
to determine whether or not any recovered write requests include a data segment smaller than the page granularity of the plurality of storage devices;

for a given write request that includes a data segment smaller than the page granularity of the plurality of storage devices, to increment the inflight write count corresponding to the content-based signature of a data page targeted by the given write request in the data structure;

to determine whether or not the decrement request postponed journal includes a decrement request corresponding to the content-based signature of the data page targeted by the given write request; and to set a decrement postponed flag corresponding to the content-based signature of the data page targeted by the given write request in the data structure based at least in part on a determination that the decrement request postponed journal includes the decrement request corresponding to the content-based signature of the data page targeted by the given write request.

* * * * *